(12) United States Patent
Acharya et al.

(10) Patent No.: US 11,943,138 B1
(45) Date of Patent: Mar. 26, 2024

(54) DETECTING DUPLICATE NETWORK DEVICE IDENTIFIERS FOR ROUTING PROTOCOLS

(71) Applicant: Arista Networks, Inc., Santa Clara, CA (US)

(72) Inventors: Soumya S. Acharya, Jamshedpur (IN); Vivek Ilangovan, Bangalore (IN); Ravi Verman, Lucknow (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 3 days.

(21) Appl. No.: 17/953,284

(22) Filed: Sep. 26, 2022

(51) Int. Cl.
*H04L 45/02* (2022.01)
*H04L 45/12* (2022.01)
*H04L 45/42* (2022.01)

(52) U.S. Cl.
CPC .............. *H04L 45/42* (2013.01); *H04L 45/02* (2013.01); *H04L 45/123* (2013.01)

(58) Field of Classification Search
CPC ........ H04L 45/42; H04L 45/02; H04L 45/123
USPC ......................................................... 709/238
See application file for complete search history.

(56) References Cited

U.S. PATENT DOCUMENTS

| | | | | |
|---|---|---|---|---|
| 11,310,155 | B1* | 4/2022 | Qian | H04L 45/123 |
| 2008/0052394 | A1* | 2/2008 | Bugenhagen | H04L 45/28 |
| | | | | 709/224 |
| 2009/0279481 | A1* | 11/2009 | Garcia Vidal | H04L 45/28 |
| | | | | 370/328 |
| 2015/0244607 | A1* | 8/2015 | Han | H04L 45/02 |
| | | | | 370/254 |
| 2016/0269293 | A1* | 9/2016 | K A | H04L 45/32 |
| 2018/0241671 | A1* | 8/2018 | Bosch | H04L 69/22 |
| 2021/0099936 | A1* | 4/2021 | Gupta | H04L 69/162 |
| 2022/0311698 | A1* | 9/2022 | Zhang | H04L 45/42 |
| 2022/0337519 | A1* | 10/2022 | Vidal | H04L 45/66 |
| 2023/0108231 | A1* | 4/2023 | Thota | H04W 74/0808 |
| | | | | 370/329 |

FOREIGN PATENT DOCUMENTS

WO   WO-2020167790 A1 *   8/2020   ............. H04L 45/02

* cited by examiner

*Primary Examiner* — Anthony Mejia
(74) *Attorney, Agent, or Firm* — Fountainhead Law Group P.C.

(57) ABSTRACT

Embodiments of the present disclosure include techniques for detecting duplicate network device identifiers for routing protocols. A network device may receive a link state packet comprising a first network device identifier for use in a routing protocol. The network device may, upon determining that the link state packet satisfies a set of conditions, start a timer. The network device may, while the timer has not elapsed, maintain a count value of link state packets received that satisfy the set of conditions. The network device may, when the timer has elapsed, determine, based on the count value and a defined threshold value, that a second network device in the network is configured with a second network device identifier for use in the routing protocol that is the same as the first network device identifier.

20 Claims, 7 Drawing Sheets

DETECTING DUPLICATE NETWORK DEVICE IDENTIFIERS FOR ROUTING PROTOCOLS

BACKGROUND

Network routing protocols define how network devices communicate with each other in order to distribute information that allows the network devices to select routes between nodes in a computer network. In generally, network devices route network traffic through the network by forwarding the network traffic from network device to network device until the network traffic reaches its intended destination. Routing algorithms are utilized to determine which routes used for a given piece of network traffic. For a particular network device, a routing protocol facilitates the sharing of information about the network devices to which the particular network device is connected. Based on this shared information, the particular network device can learn the topology of the network around the network device.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for detecting duplicate network device identifiers for routing protocols. In some embodiments, a network includes several network devices belonging to the same area that are each configured to exchange network topology information using a routing protocol. Each of the network devices is configured to detect whether it is configured with the same system identifier (ID), which is used to exchange network topology information via n the routing protocol, as another network device in the network. Each network device communicates its topology information to other network devices in the network by flooding network devices with link state packets. To detect whether another network device is configured with the same system ID, a network device monitors the link state packets that it receives. If (1) the link state packet identifier in a received link state packet, which is the system ID of the network device that sent the link state packet, is the same as the system ID of a network device and the link state packet has a higher sequence number than the sequence number in the last link state packet transmitted by the network device or (2) the link state packet identifier in the received link state packet is the same as the system ID of a network device and the checksum of the link state packet is different than the checksum of the last link state packet transmitted by the network device, the network device starts a timer having a defined amount of time. While the timer has not elapsed, the network device keeps track of the number of received link state packets that either has (1) a link state packet identifier that is the same as the system ID of the network device and the link state packet has a higher sequence number than the sequence number in the last link state packet transmitted by the network device or (2) the link state packet identifier is the same as the system ID of a network device and the checksum of the link state packet is different than the checksum of the last link state packet transmitted by the network device. After timer has elapsed, the network device determines if the number of such link state packets that the network device received during the timer is greater than a defined threshold value. If so, the network device determines that another network device in the same area of the network is configured with the same system ID as itself.

Figure 1:
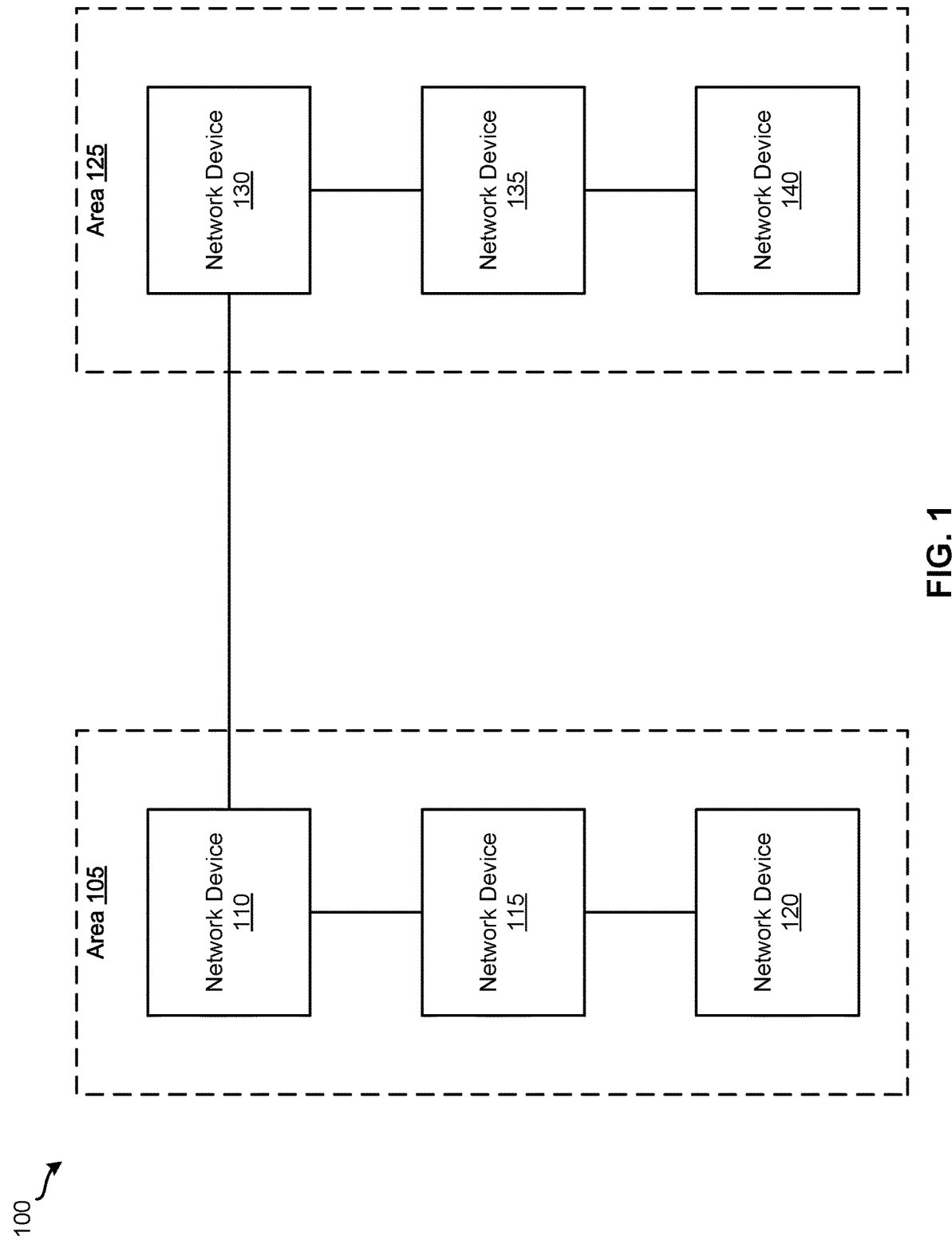
FIG. 1 illustrates a network according to some embodiments.

FIG. 1 illustrates a network 100 according to some embodiments. As shown, network 100 includes area 105 and area 125. Area 105 includes network devices 110-120 while area 125 includes network devices 130-140. For this example, each of the network devices 110-120 is configured with an area identifier (ID) associated with area 105. Similarly, each of the network devices 130-140 is configured with an area ID associated with area 125.

In area 105, network devices 110-120 are communicatively coupled to each other. Specifically, network device 110 is connected to network device 115 and network device 115 is connected to network device 120. In this example, network device 115 is adjacent to network device 110. Network device 115 is also adjacent to network device 120. Network devices 110 and 120 are not adjacent to each other since network device 115 is positioned between network devices 110 and 120. Network devices 110 and 120 may be referred to as non-adjacent network devices. In general, network devices 110-120 route and/or forward network traffic (e.g., packets) through network 100 so that the network traffic reaches its intended destination. In order to do so, each of the network devices 110-120 routes and/or forwards network traffic based on a network topology that it determines from network topology information exchanged with other network devices in area 105 via a routing protocol. Here, network devices 110-120 utilize a link-state routing protocol to exchange such information. Examples of link-state routing protocols include an open shortest path first (OSPF) routing protocol, an intermediate system to intermediate system (IS-IS) routing protocol, etc.

Area 125 and its network devices are configured to operate in a similar manner. As depicted in FIG. 1, area 125 includes network devices 130-140. Network device 130 is connected to network device 135 and network device 135 is connected to network device 140. For this example, network devices 130 and 135 are adjacent network devices. Network devices 135 and 140 are also adjacent network devices. Network devices 130 and 140 are non-adjacent network devices. Network devices 130-140 route and/or forward network traffic (e.g., packets) through network 100 so that the network traffic reaches its intended destination. To do so, each of the network devices 130-140 routes and/or forwards network traffic based on a network topology that it determines from network topology information exchanged with other network devices in area 125 via a routing protocol. In this example, network devices 130-140 use a link-state routing protocol to exchange network topology information. As mentioned above, examples of link-state routing protocols include an OSPF routing protocol, an IS-IS routing protocol, etc.

FIGS. 2A-2D illustrate an example of detecting duplicate network device identifiers for a routing protocol in network 100 according to some embodiments. This example will be explained from the perspective of network device 110. However, one of ordinary skill in the art will understand that each of the network devices in network 100 is configured to employ this technique. As such, for this example, network device 120 would also detect that another network device is configured with the same system ID.

Figure 2A:
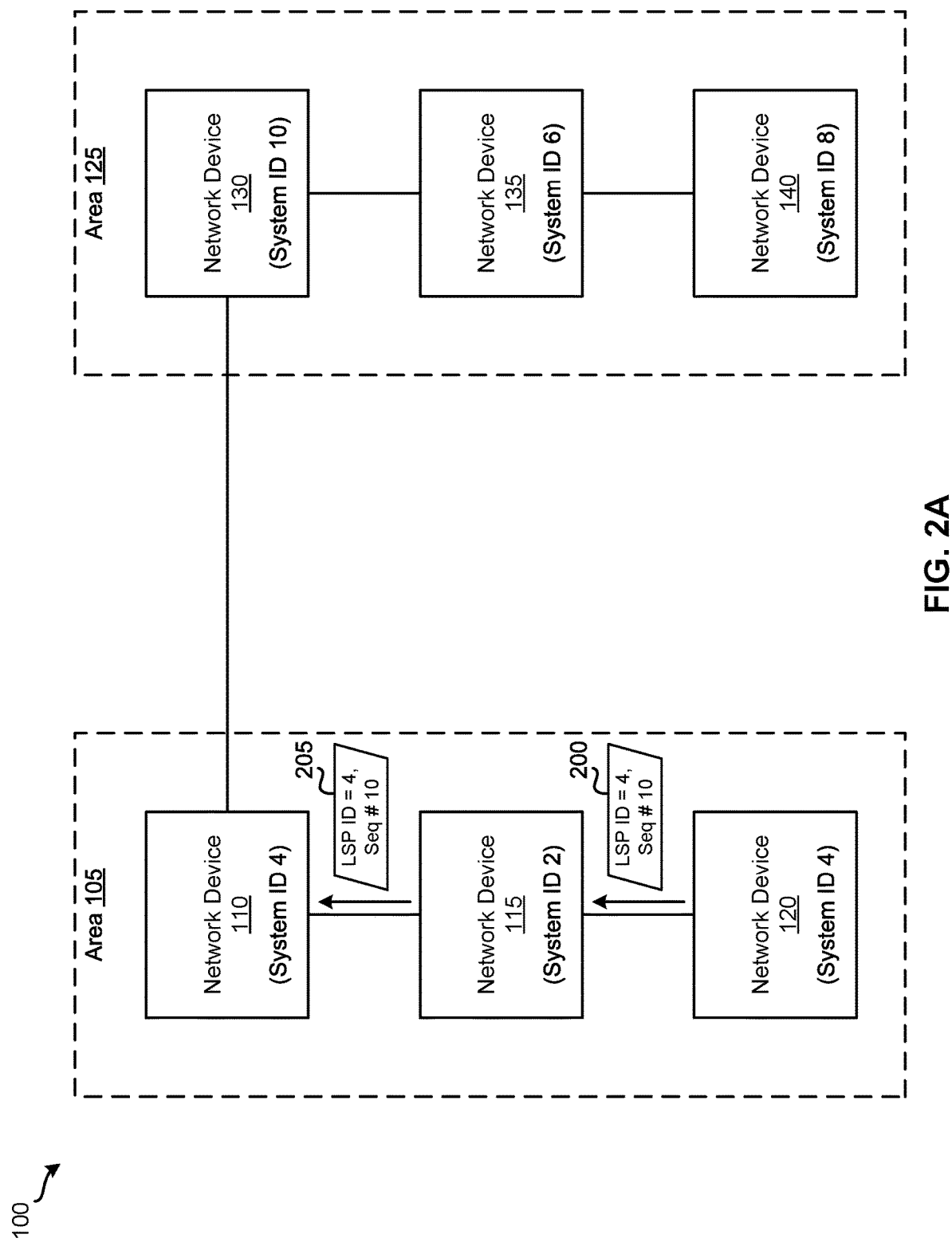
FIGS. 2A-2D illustrate an example of detecting duplicate network device identifiers for a routing protocol in the network illustrated in FIG. 1 according to some embodiments.

FIG. 2A illustrates the configuration of the network devices in network 100 for this example. As shown, network devices 110 and 120 are each configured with a system ID of 4, network device 115 is configured with a system ID of 2, network device 130 is configured with a system ID of 10, network device 135 is configured with a system ID of 6, and network device 140 is configured with a system ID of 8. The example begins by network device 120 flooding area 105 with link state packet 200. Here, link state packet 200 includes a list of network devices directly connected to network device 120 (e.g., neighboring or adjacent network devices), a link state packet identifier (LSP ID) having the same value as the system ID of network device 120 (4 in this example), and a sequence identifier of 10.

In some embodiments, each of the network devices 110-120 and 130-140 uses a sequence identifier to keep track of the link state packets with which the network device has flooded a network area. Each time a network device sends out a link state packet to other network devices in the same area, the network device adjusts its current sequence identifier (e.g., by incrementing the sequence identifier, by decrementing the sequence identifier, etc.) and includes the newly adjusted current sequence identifier in the link state packet.

When network device 120 floods area 105 with link state packet 200, network device 115 receives it. In response, network device 115 forwards a copy of link state packet 200, which is depicted as link state packet 205 in FIG. 2A, to network device 110. Whenever network device 110 receives a link state packet, network device 110 determines whether the link state packet satisfies a set of conditions. If so, network device 110 generates a timer having a define amount of time. In some embodiments, network device 110 determines the amount of time for the timer based on the interval at which network device 110 sends out link state packets (also referred to as a link state packet generation interval) and a defined value (e.g., 5, 10, 25, 50, etc.). The link state packet generation interval of network device 110 can be configured with a value from a range of possible values (e.g., 1 to 500 milliseconds, 1 to 1000 milliseconds, 1 to 3000 milliseconds, etc.). In some instances, network device 110 determines the amount of time for the timer by multiplying the defined value and the maximum possible value that can be set for the link state packet generation interval. For example, if the defined value is 15 and the range of possible values that can be used for the link state packet generation interval is 1 to 2500 milliseconds, then network device 110 determines the amount of time for the timer to be 37,500 milliseconds (15×2500 milliseconds).

In this example, the set of conditions specifies that a link state packet with an LSP ID that is the same as the system ID of network device 110 and a sequence identifier that is higher than network device 110's current sequence identifier. For this example, the current sequence identifier of network device 110 is 8. When network device 110 receives link state packet 205, it determines that the LSP ID of link state packet 205 is the same as the system ID with which network device 110 is configured (4 in this example) and the sequence identifier of link state packet 205 is higher than network device 110's current sequence identifier. As such, network device 110 generates a timer having a define amount of time determined using the techniques described above. In addition, network device 110 starts tracking the number of link state packets that network device 110 receives while the timer is active (e.g., has not elapsed) that satisfy the set of conditions by maintaining a count of the number of such received link state packets. Here, network device 110 initializes the value of the count to 1 to account for link state packet 205.

Figure 2B:
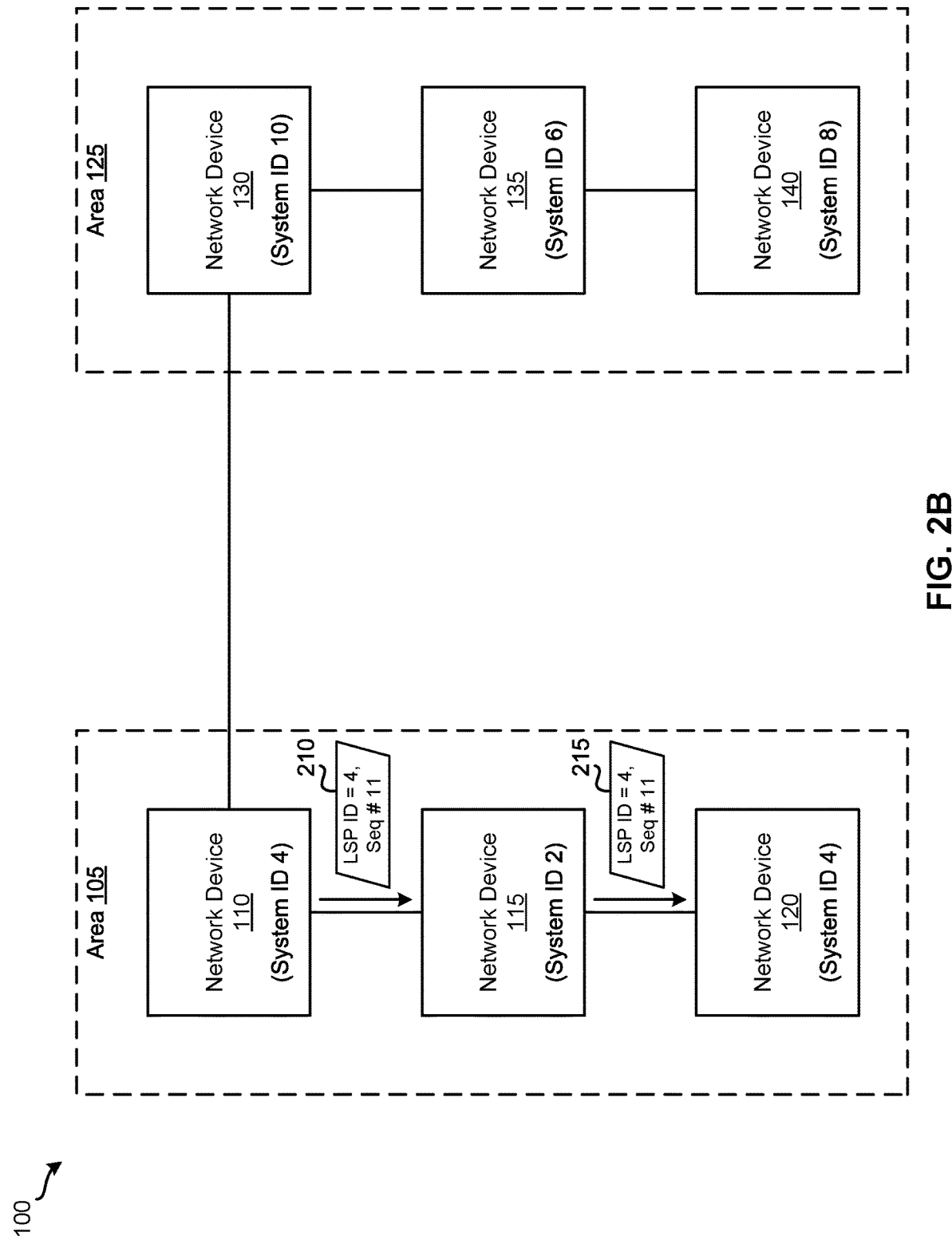

Receiving a link state packet that satisfies the set of conditions also causes network device 110 to use the sequence identifier in the receive link state packet as its current sequence identifier. Thus, network device 110 updates its current sequence identifier from 8 to 10. Next, network device 110 floods area 105 with link state packet 210, as depicted in FIG. 2B. Link state packet 210 includes a list of network devices directly connected to network device 110 (e.g., neighboring or adjacent network devices), an LSP ID having the same value as the system ID of network device 110 (4 in this example), and a sequence identifier of 11. As mentioned above, each time a network device sends out a link state packet to other network devices in the same area, the network device adjusts its current sequence identifier (e.g., by incrementing the sequence identifier, by decrementing the sequence identifier, etc.) and includes the newly adjusted current sequence identifier in the link state packet. To send out link state packet 210, network device 110 first increments its current sequence identifier from 10 to 11 and then includes the sequence identifier of 11 in link state packet 210.

Network device 115 receives link state packet 210 upon network device 110 flooding area 105 with link state packet 210. In response to receiving link state packet 210, network device 115 forwards a copy of link state packet 210, which is illustrated in FIG. 2B as link state packet 215, to network device 120. Receiving a link state packet with an LSP ID that is the same as the system ID of network device 120 and a sequence identifier that is higher than network device 120's current sequence identifier causes network device 120 to use the sequence identifier in the receive link state packet as its current sequence identifier. Once network device 120 receives link state packet 215, network device 120 determines that the LSP ID of link state packet 215 is the same as the system ID with which network device 120 is configured (4 in this example) and the sequence identifier of link state packet 215 that is higher than network device 120's current sequence identifier. The current sequence identifier of network device 120 is 10 so network device 120 updates its current sequence identifier to 11.

Figure 2C:
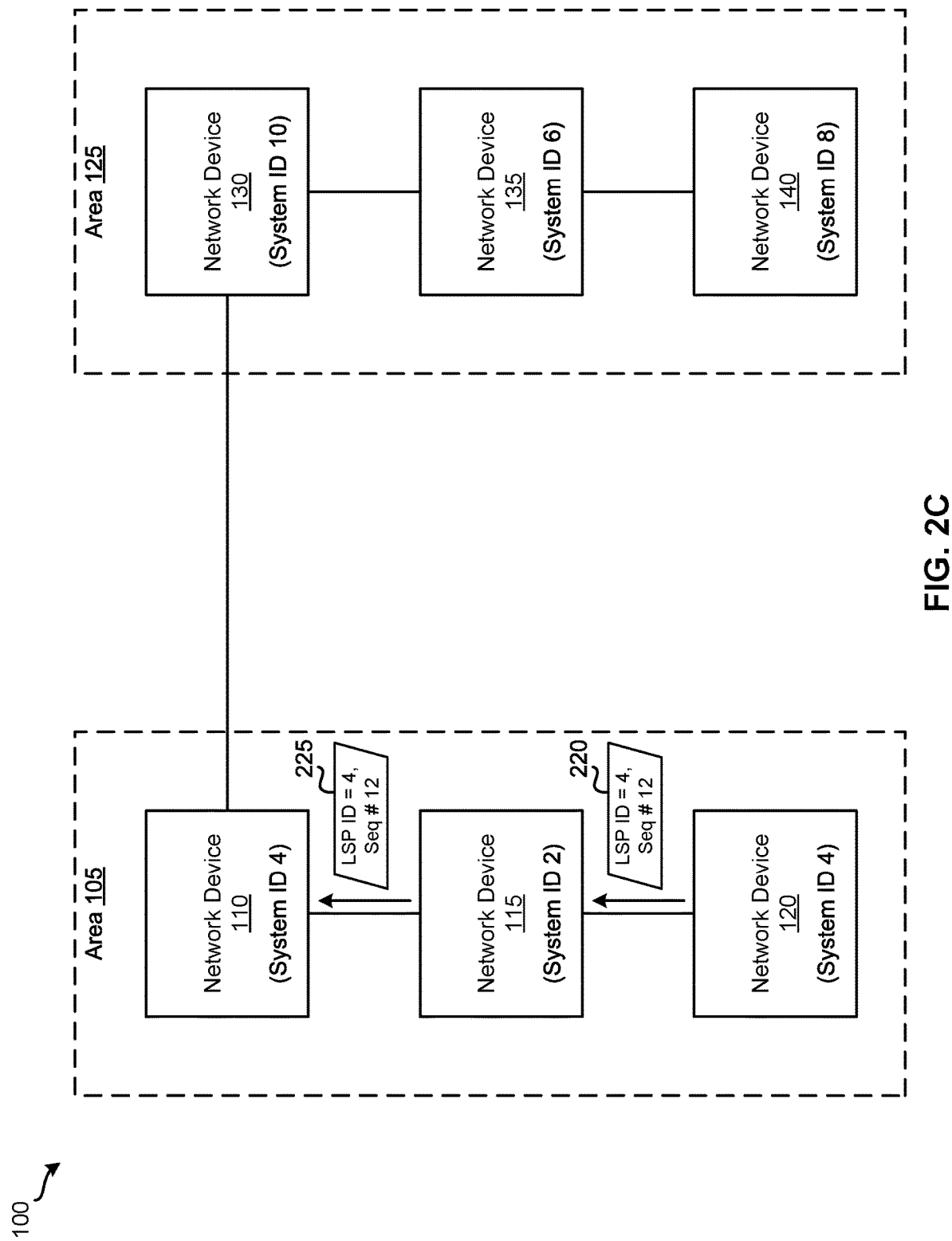

Network device 120 then floods area 105 with link state packet 220, as depicted in FIG. 2C. Link state packet 220 includes a list of network devices directly connected to network device 120 (e.g., neighboring or adjacent network devices), an LSP ID having the same value as the system ID of network device 120 (4 in this example), and a sequence identifier of 12. As described above, each time a network device sends out a link state packet to other network devices in the same area, the network device adjusts its current sequence identifier (e.g., by incrementing the sequence identifier, by decrementing the sequence identifier, etc.) and includes the newly adjusted current sequence identifier in the link state packet. Thus, network device 120 sends out link state packet 220 by incrementing its current sequence identifier from 11 to 12 and including the sequence identifier of 12 in link state packet 220.

When network device 115 receives link state packet 220 from network device 120, network device 115 forwards a copy of link state packet 220, which is depicted in FIG. 2C as link state packet 225, to network device 110. In response to receiving link state packet 225, network device 110 determines that it satisfies the set of conditions. Here, the timer is still active (e.g., has not elapsed) so network device 110 increments the count of the number of received link state packets that satisfy the set of conditions from 1 to 2. Because link state packet 225 satisfies the set of conditions (i.e., it has an LSP ID that is the same as the system ID of network device 110 and a sequence identifier that is higher than network device 110's current sequence identifier), network device 110 updates its current sequence identifier to the sequence identifier in link state packet 225. Therefore, network device 110 updates its current sequence identifier from 11 to 12.

Figure 2D:
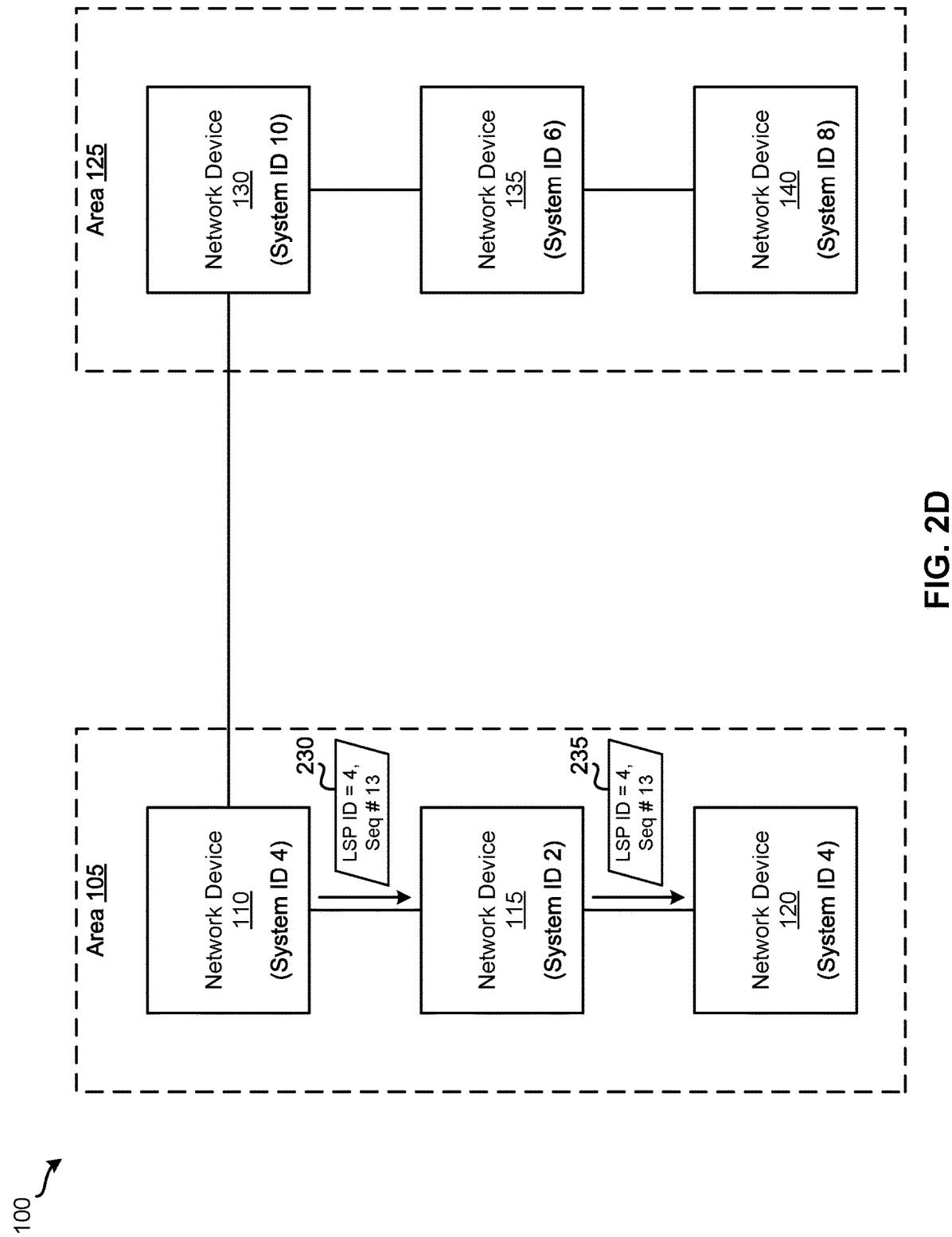

Then, network device 110 floods area 105 with link state packet 230, as illustrated in FIG. 2D. Link state packet 230 includes a list of network devices directly connected to network device 110 (e.g., neighboring or adjacent network devices), an LSP ID having the same value as the system ID of network device 110 (4 in this example), and a sequence identifier of 13. As explained above, each time a network device sends out a link state packet to other network devices in the same area, the network device adjusts its current sequence identifier (e.g., by incrementing the sequence identifier, by decrementing the sequence identifier, etc.) and includes the newly adjusted current sequence identifier in the link state packet. As such, network device 110 sends out link state packet 230 by incrementing its current sequence identifier from 12 to 13 and then including the sequence identifier of 13 in link state packet 230.

Since network devices 110 and 120 are configured with the same system ID, this causes network devices 110 and 120 to repeatedly send out link state packets with continuously increasing sequence numbers because each of the network devices 110 and 120 thinks that the link state packets that it receives are its own, as demonstrated in FIGS. 2A-2D. In this example, network device 110 continues to maintain the count of received link state packets that satisfy the set of conditions while the timer is active (e.g., has not elapsed). Once network device 110 detects that the timer has elapsed, network device 110 compares the count of the number of received link state packets that satisfy the set of conditions with a defined threshold value (e.g., 3, 5, 10, 15, etc.). If the count is greater than or equal to the defined threshold value, network device 110 determines that another network device in the same area of the network is configured with the same system ID as itself. In response to this determination, network device 110 stores a message in a storage (e.g., a system log) indicating that another network device in the network is determined to be configured with the same system ID used in the routing protocol as the system ID configured for the network device. A user of network device 110 can check for such messages by network device 110 (e.g., sending (via a command line interface provided by network device 110) a request for any such messages. When network device 110 receives the request, network device 110 accesses the storage and retrieves the message and provides it to the user (e.g., via a command line interface provided by network device 110).

The example described above by reference to FIGS. 2A-2D shows how a particular type of link state packet that a network device receives (i.e., a link state packet with an LSP ID that is the same as the system ID of the network device and a sequence identifier that is higher than the network device's current sequence identifier) can be used to determine whether other network devices in the same are of a network are configured with the same system ID as the network device. One of ordinary skill in the art will appreciate that additional and/or different types of link state packets may be used to determine whether other network devices in the same are of a network are configured with the same system ID as the network device. For example, in some embodiments, a link state packet with an LSP ID that is the same as the system ID of a network device, a sequence identifier that is the same as the network device's current sequence identifier, but a different checksum than the checksum of the previous link state packet that the network device sent out can trigger the start of the timer and/or increase the count. This type of link state packet can be added to the set of conditions that trigger the start of the timer and/or increase the count of received link state packets that satisfy the set of conditions. In some such embodiments, the network device keeps track of the checksums of the link state packets that it sends out to the network. For example, for each link state packet that the network device sends out to the network, the network device uses a checksum function on the link state packet to generate a checksum value. When the network device receives a link state packet with an LSP ID that is the same as the system ID of the network device and a sequence identifier that is the same as the network device's current sequence identifier, the network device uses the checksum function on the received link state packet to generate another checksum value. Then, the network device compares the two checksum values. If the checksum values are different, the network device starts a timer or, if a timer is already running, increases the count of received link state packets that satisfy the set of conditions.

Figure 3:
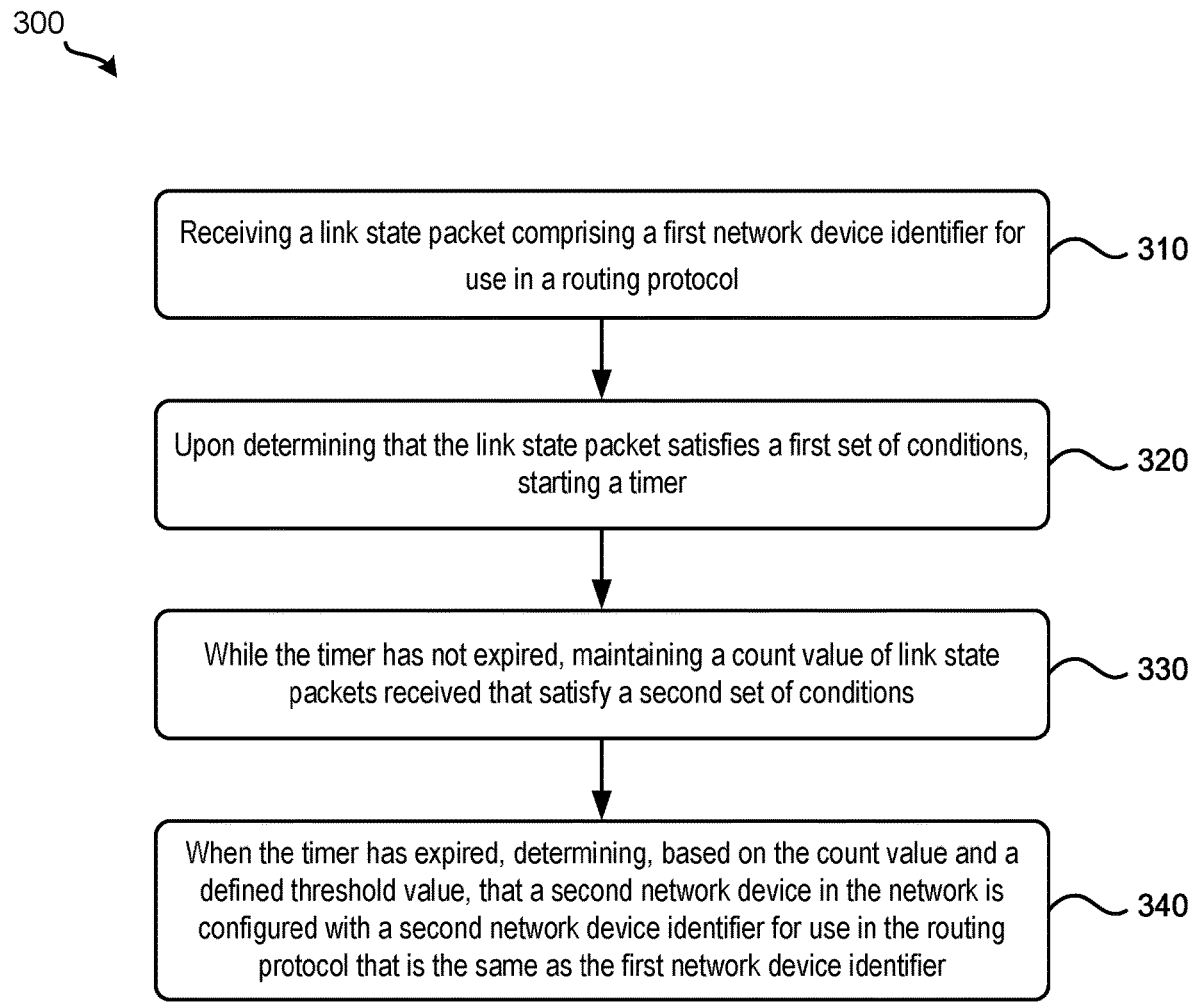
FIG. 3 illustrates a process for detecting duplicate network device identifiers for routing protocols according to some embodiments.

FIG. 3 illustrates a process 300 for detecting duplicate network device identifiers for routing protocols according to some embodiments. In some embodiments, a network device (e.g., network device 110, network device 115, network device 120, network device 130, network device 135, network device 140, etc.) that is configured to use a routing protocol to exchange network topology information with other network devices performs process 300. Process 300 starts by receiving, at 310, a link state packet comprising a first network device identifier for use in a routing protocol. Referring to FIG. 2A as an example, network device 110 may receive link state packet 205 via a link state routing protocol. The LSP ID in link state packet 205 is used in the link state routing protocol.

Next, upon determining that the link state packet satisfies a set of conditions, process 300 starts, at 320, a timer. Referring to FIG. 2A as an example, when network device 110 receives link state packet 205, network device 110 determines that link state packet 205 satisfies the set of conditions mentioned above. That is, link state packet 205 has an LSP ID that is the same as the system ID of network device 110 and a sequence identifier that is higher than network device 110's current sequence identifier.

While the timer has not elapsed, process 300 maintains, at 330, a count value of link state packets received that satisfy the set of conditions. Referring to FIGS. 2A and 2C as an example, network device 110 initializes the value of the count to 1 when it received link state packet 205. Then, network device incremented the count to 2 upon receiving link state packet 225.

Finally, when the timer has elapsed, process 300 determines, at 340, based on the count value and a defined threshold value, that a second network device in the network is configured with a second network device identifier for use in the routing protocol that is the same as the first network device identifier. Referring to FIGS. 2A-2D as an example, network device 110 determines that another network device in network 100 is configured with the same system ID as itself the count of the number of received link state packets that network device 110 receive during the time the timer is active is greater than or equal to a defined threshold value.

Figure 4:
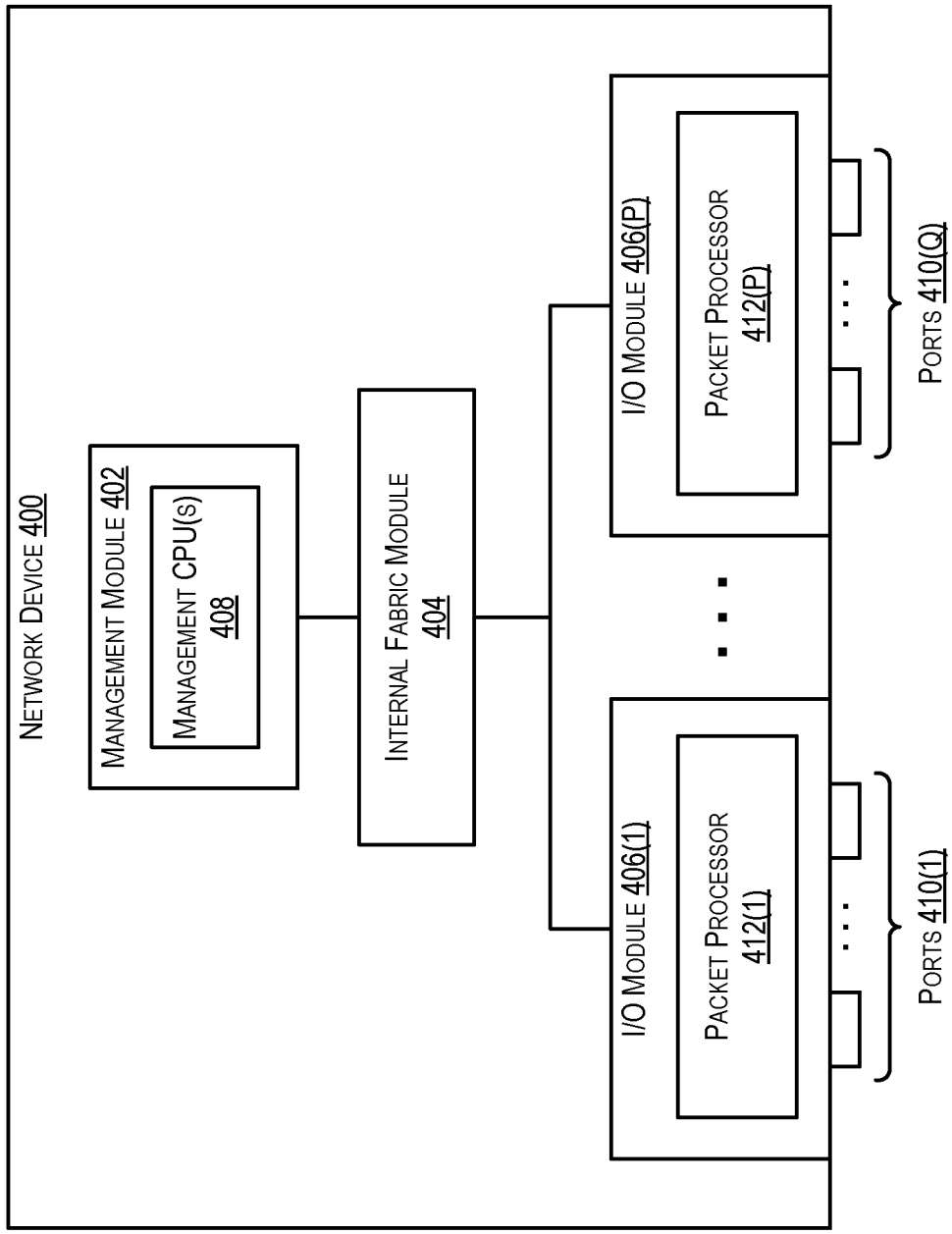
FIG. 4 illustrates an example network device according to some embodiments.

FIG. 4 illustrates the architecture of an example network device (e.g., a network switch or router) 400 that may implement the techniques of the present disclosure according to certain embodiments. For example, network device 400 may be used to implement network devices 110-120 and 130-140 shown in FIGS. 1 and 2A-2D.

Network device 400 includes a management module 402, an internal fabric module 404, and a number of I/O modules 406(1)-(P). Management module 402 includes one or more management CPUs 408 for managing/controlling the operation of the device. Each management CPU 408 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 404 and I/O modules 406(1)-(P) collectively represent the data, or forwarding, plane of network device 400. Internal fabric module 404 is configured to interconnect the various other modules of network device 400. Each I/O module 406 includes one or more input/output ports 410(1)-(Q) that are used by network device 400 to send and receive network packets. Each I/O module 406 can also include a packet processor 412, which is a hardware processing component that can make wire speed decisions on how to handle incoming or outgoing network packets.

It should be appreciated that network device 400 is illustrative and other configurations having more or fewer components than network device 400 are possible.

The following are some example embodiments of the present disclosure. In some embodiments, the techniques described herein relate to a method executable by a first network device in a network, the method including: receiving a link state packet including a first network device identifier for use in a routing protocol; upon determining that the link state packet satisfies a set of conditions, starting a timer; while the timer has not elapsed, maintaining a count value of link state packets received that satisfy the set of conditions; and when the timer has elapsed, determining, based on the count value and a defined threshold value, that a second network device in the network is configured with a second network device identifier for use in the routing protocol that is the same as the first network device identifier.

In some embodiments, the techniques described herein relate to a method, wherein the link state packet is a first link state packet further including a first sequence identifier, the method further including, at a defined interval, flooding the network with a second link state packet, the second link state packet including the first network identifier and a second sequence identifier.

In some embodiments, the techniques described herein relate to a method, wherein a condition in the set of conditions specifies that the first sequence identifier is greater than the second sequence identifier.

In some embodiments, the techniques described herein relate to a method, wherein a condition in the set of conditions specifies that the first sequence identifier and the second sequence identifier are the same and that a first set of data in the first link state packet is different than a second set of data in the second link state packet.

In some embodiments, the techniques described herein relate to a method further including determining that the first set of data in the first link state packet is different than the second set of data in the second link state packet by: performing a first checksum operation on the first link state packet to produce a first value, performing a second checksum operation on second link state packet to produce a second value, and comparing the first value and the second value.

In some embodiments, the techniques described herein relate to a method, wherein the link state packet is a first link state packet further including a first sequence identifier, the method further including: receiving a second link state packet including the first network identifier and a second sequence identifier; determining that that the second link state packet satisfies the set of conditions; and incrementing the count value.

In some embodiments, the techniques described herein relate to a method, wherein a condition in the set of conditions specifies that the second sequence identifier is greater than the first sequence identifier.

In some embodiments, the techniques described herein relate to a method, wherein a condition in the set of conditions specifies that the first sequence identifier and the second sequence identifier are the same and that a first set of data in the first link state packet is different than a second set of data in the second link state packet.

In some embodiments, the techniques described herein relate to a method further including determining that the first set of data in the first link state packet is different than the second set of data in the second link state packet by: performing a first checksum operation on the first link state packet to produce a first value, performing a second checksum operation on second link state packet to produce a second value, and comparing the first value and the second value.

In some embodiments, the techniques described herein relate to a method, wherein the first network device and the second network device are not adjacent network devices in the network.

In some embodiments, the techniques described herein relate to a non-transitory machine-readable medium storing a program executable by at least one processing unit of a first network device, the program including sets of instructions for: receiving a packet through a routing protocol, the packet including a first identifier for identifying the first network device in the routing protocol; upon determining that the packet satisfies a set of conditions, starting a timer; while the timer has not elapsed, maintaining a count value of packets received through the routing protocol that satisfy the set of conditions; and when the timer has elapsed, determining, based on the count value and a defined threshold value, that a second network device in the network is configured with a second identifier for identifying the second network device in the routing protocol that is the same as the first identifier.

In some embodiments, the techniques described herein relate to a non-transitory machine-readable medium, wherein the routing protocol for exchanging network topology information with network devices in the network.

In some embodiments, the techniques described herein relate to a non-transitory machine-readable medium, wherein the packet is a first packet further including a first sequence identifier, the method further including, at a defined interval, flooding the network with a second packet, the second packet including the first identifier and a second sequence identifier.

In some embodiments, the techniques described herein relate to a non-transitory machine-readable medium, wherein a condition in the set of conditions specifies that the first sequence identifier is greater than the second sequence identifier.

In some embodiments, the techniques described herein relate to a non-transitory machine-readable medium, wherein a condition in the set of conditions specifies that the first sequence identifier and the second sequence identifier are the same and that a first set of data in the first packet is different than a second set of data in the second packet.

In some embodiments, the techniques described herein relate to a non-transitory machine-readable medium, wherein the program further includes a set of instructions for determining that the first set of data in the first packet is different than the second set of data in the second packet by: performing a first checksum operation on the first packet to produce a first value, performing a second checksum operation on second packet to produce a second value, and comparing the first value and the second value.

In some embodiments, the techniques described herein relate to a system including: a set of processing units; and a non-transitory machine-readable medium storing instructions that when executed by at least one processing unit in the set of processing units cause the at least one processing unit to: receive a packet including a first network device identifier for use in a routing protocol; upon determining that the packet satisfies a set of conditions, start a timer; while the timer has not elapsed, maintain a count value of packets received that satisfy the set of conditions; and when the timer has elapsed, determine, based on the count value and a defined threshold value, that a second network device in the network is configured with a second network device identifier for use in the routing protocol that is the same as the first network device identifier.

In some embodiments, the techniques described herein relate to a system, wherein the packet is a first packet further including a first sequence identifier, the method further including: receiving a second packet including the first network identifier and a second sequence identifier; determining that that the second packet satisfies the set of conditions; and incrementing the count value.

In some embodiments, the techniques described herein relate to a system, wherein a condition in the set of conditions specifies that the second sequence identifier is greater than the first sequence identifier.

In some embodiments, the techniques described herein relate to a system, wherein a condition in the set of conditions specifies that the first sequence identifier and the second sequence identifier are the same and that a first set of data in the first packet is different than a second set of data in the second packet.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents will be evident to those skilled in the art and may be employed without departing from the spirit and scope of the disclosure as defined by the claims.

What is claimed is:

1. A method executable by a first network device in a network, the method comprising:
receiving a link state packet comprising a first network device identifier for use in a routing protocol;
upon determining that the link state packet satisfies a set of conditions, starting a timer;
while the timer has not elapsed, maintaining a count value of link state packets received that satisfy the set of conditions; and
when the timer has elapsed, determining, based on the count value and a defined threshold value, that a second network device in the network is configured with a second network device identifier for use in the routing protocol that is the same as the first network device identifier.

2. The method of claim 1, wherein the link state packet is a first link state packet further comprising a first sequence identifier, the method further comprising, at a defined interval, flooding the network with a second link state packet, the second link state packet comprising the first network identifier and a second sequence identifier.

3. The method of claim 2, wherein a condition in the set of conditions specifies that the first sequence identifier is greater than the second sequence identifier.

4. The method of claim 2, wherein a condition in the set of conditions specifies that the first sequence identifier and the second sequence identifier are the same and that a first set of data in the first link state packet is different than a second set of data in the second link state packet.

5. The method of claim 4 further comprising determining that the first set of data in the first link state packet is different than the second set of data in the second link state packet by:
performing a first checksum operation on the first link state packet to produce a first value,
performing a second checksum operation on second link state packet to produce a second value, and
comparing the first value and the second value.

6. The method of claim 1, wherein the link state packet is a first link state packet further comprising a first sequence identifier, the method further comprising:
receiving a second link state packet comprising the first network identifier and a second sequence identifier;
determining that that the second link state packet satisfies the set of conditions; and
incrementing the count value.

7. The method of claim 6, wherein a condition in the set of conditions specifies that the second sequence identifier is greater than the first sequence identifier.

8. The method of claim 6, wherein a condition in the set of conditions specifies that the first sequence identifier and the second sequence identifier are the same and that a first set of data in the first link state packet is different than a second set of data in the second link state packet.

9. The method of claim 8 further comprising determining that the first set of data in the first link state packet is different than the second set of data in the second link state packet by:
- performing a first checksum operation on the first link state packet to produce a first value,
- performing a second checksum operation on second link state packet to produce a second value, and
- comparing the first value and the second value.

10. The method of claim 1, wherein the first network device and the second network device are not adjacent network devices in the network.

11. A non-transitory machine-readable medium storing a program executable by at least one processing unit of a first network device, the program comprising sets of instructions for:
- receiving a packet through a routing protocol, the packet comprising a first identifier for identifying the first network device in the routing protocol;
- upon determining that the packet satisfies a set of conditions, starting a timer;
- while the timer has not elapsed, maintaining a count value of packets received through the routing protocol that satisfy the set of conditions; and
- when the timer has elapsed, determining, based on the count value and a defined threshold value, that a second network device in the network is configured with a second identifier for identifying the second network device in the routing protocol that is the same as the first identifier.

12. The non-transitory machine-readable medium of claim 11, wherein the routing protocol for exchanging network topology information with network devices in the network.

13. The non-transitory machine-readable medium of claim 11, wherein the packet is a first packet further comprising a first sequence identifier, the program further comprising a set of instructions for, at a defined interval, flooding the network with a second packet, the second packet comprising the first identifier and a second sequence identifier.

14. The non-transitory machine-readable medium of claim 13, wherein a condition in the set of conditions specifies that the first sequence identifier is greater than the second sequence identifier.

15. The non-transitory machine-readable medium of claim 13, wherein a condition in the set of conditions specifies that the first sequence identifier and the second sequence identifier are the same and that a first set of data in the first packet is different than a second set of data in the second packet.

16. The non-transitory machine-readable medium of claim 15, wherein the program further comprises a set of instructions for determining that the first set of data in the first packet is different than the second set of data in the second packet by:
- performing a first checksum operation on the first packet to produce a first value,
- performing a second checksum operation on second packet to produce a second value, and
- comparing the first value and the second value.

17. A system comprising:
- a set of processing units; and
- a non-transitory machine-readable medium storing instructions that when executed by at least one processing unit in the set of processing units cause the at least one processing unit to:
- receive a packet comprising a first network device identifier for use in a routing protocol;
- upon determining that the packet satisfies a set of conditions, start a timer;
- while the timer has not elapsed, maintain a count value of packets received that satisfy the set of conditions; and
- when the timer has elapsed, determine, based on the count value and a defined threshold value, that a second network device in the network is configured with a second network device identifier for use in the routing protocol that is the same as the first network device identifier.

18. The system of claim 17, wherein the packet is a first packet further comprising a first sequence identifier, wherein the instructions further cause the at least one processing unit to:
- receive a second packet comprising the first network identifier and a second sequence identifier;
- determine that that the second packet satisfies the set of conditions; and
- increment the count value.

19. The system of claim 18, wherein a condition in the set of conditions specifies that the second sequence identifier is greater than the first sequence identifier.

20. The system of claim 18, wherein a condition in the set of conditions specifies that the first sequence identifier and the second sequence identifier are the same and that a first set of data in the first packet is different than a second set of data in the second packet.

* * * * *